(12) United States Patent
Matsumoto

(10) Patent No.: US 8,820,451 B2
(45) Date of Patent: Sep. 2, 2014

(54) AIR-COOLED FUEL CELL VEHICLE

(75) Inventor: Shiro Matsumoto, Shizuoka-ken (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 0 days.

(21) Appl. No.: 13/821,489

(22) PCT Filed: Jun. 6, 2011

(86) PCT No.: PCT/JP2011/062887
§ 371 (c)(1),
(2), (4) Date: Mar. 7, 2013

(87) PCT Pub. No.: WO2012/053246
PCT Pub. Date: Apr. 26, 2012

(65) Prior Publication Data
US 2013/0168167 A1 Jul. 4, 2013

(30) Foreign Application Priority Data

Oct. 21, 2010 (JP) ................................ 2010-236186

(51) Int. Cl.
*B60K 11/00* (2006.01)
*B60K 11/06* (2006.01)
(Continued)

(52) U.S. Cl.
CPC ............ *B60L 11/1892* (2013.01); *B60K 13/02* (2013.01); *H01M 2250/20* (2013.01); *B60L 11/1896* (2013.01); *B60Y 2400/61* (2013.01); *B60K 11/06* (2013.01); *B60K 2001/0438* (2013.01); *B60K 2001/001* (2013.01); *B60K 2015/03315* (2013.01); *B60K 2015/0632* (2013.01); *H01M 8/04014* (2013.01); *Y02E 60/50* (2013.01); *B60K 2001/005* (2013.01); *B60K 15/07* (2013.01); *B60K 8/00* (2013.01); *B60K 1/04* (2013.01); *B60K 2001/0416* (2013.01); *Y02T 90/32* (2013.01)
USPC ...... 180/68.1; 180/68.5; 180/65.31; 180/65.1

(58) Field of Classification Search
USPC ............................ 180/68.1–68.3, 65.1, 65.31
See application file for complete search history.

(56) References Cited

U.S. PATENT DOCUMENTS 5,212,431 A  5/1993 Origuchi et al.
(Continued)

FOREIGN PATENT DOCUMENTS

JP  4-29504 A  1/1992
(Continued)

OTHER PUBLICATIONS

Internationa Search Report for Application No. PCT/JP2011/062887; dated Aug. 9, 2011.
(Continued)

*Primary Examiner* — J. Allen Shriver, II
*Assistant Examiner* — Travis Coolman
(74) *Attorney, Agent, or Firm* — Alston & Bird LLP

(57) ABSTRACT

An object of the present invention is to increase the vehicle compartment space of a fuel cell vehicle, to reduce the airflow resistance by extending an exhaust duct straight, and to improve the cooling performance on an air-cooled fuel cell stack by increasing the amount of air introduced into the air-cooled fuel cell stack. For this purpose, an air-cooled fuel cell vehicle includes, at a rear portion of the fuel cell vehicle: a motor configured to drive a rear wheel: an air-cooled fuel cell stack including an air intake section configured to take in air used as a reacting gas and also as a cooling medium, and an air exhaust section configured to discharge an excess reacting gas containing air and hydrogen; an intake duct mounted on the air intake section; and an exhaust duct mounted on the air exhaust section and extending to a rear end portion of the fuel cell vehicle. In the air-cooled fuel cell vehicle, the air-cooled fuel cell stack is disposed under a rear floor of the air-cooled fuel cell vehicle and rearward of a rear wheel axle in a vehicle longitudinal direction, while the air intake section is oriented upward and inclined in such a manner that the air intake section is located closer to the rear floor as extending to a rear side of the vehicle.

2 Claims, 4 Drawing Sheets

(51) Int. Cl.
*B60K 13/02* (2006.01)
*B60L 11/18* (2006.01)
*H01M 8/04* (2006.01)
*B60K 8/00* (2006.01)
*B60K 1/04* (2006.01)
*B60K 1/00* (2006.01)
*B60K 15/03* (2006.01)
*B60K 15/063* (2006.01)
*B60K 15/07* (2006.01)

(56) References Cited

U.S. PATENT DOCUMENTS

| | | | |
|---|---|---|---|
| 6,548,199 B1* | 4/2003 | Tanaka et al. | 429/439 |
| 6,649,290 B2* | 11/2003 | Leboe et al. | 429/423 |
| 6,962,230 B2 | 11/2005 | Hanaya et al. | |
| 7,069,893 B2 | 7/2006 | Cusumano et al. | |
| 7,096,986 B2* | 8/2006 | Borroni-Bird et al. | 180/68.1 |
| 7,296,645 B1* | 11/2007 | Kerner et al. | 180/68.1 |
| 7,361,201 B2* | 4/2008 | Nakagome et al. | 55/385.3 |
| 7,478,698 B2* | 1/2009 | Shimizu et al. | 180/220 |
| 7,556,113 B2* | 7/2009 | Amori et al. | 180/68.5 |
| 7,595,125 B2 | 9/2009 | Enjoji et al. | |
| 7,770,679 B2* | 8/2010 | Takaku et al. | 180/68.5 |
| 7,851,101 B2 | 12/2010 | Tanaka | |
| 8,037,956 B2* | 10/2011 | Noguchi et al. | 180/65.31 |
| 8,268,470 B2* | 9/2012 | Matsumoto et al. | 429/71 |
| 2003/0037983 A1* | 2/2003 | Hanaya et al. | 180/309 |
| 2007/0154757 A1* | 7/2007 | Okazaki | 429/26 |
| 2009/0191805 A1* | 7/2009 | Cusumano et al. | 454/158 |
| 2010/0003576 A1 | 1/2010 | Tamura | |
| 2010/0071980 A1* | 3/2010 | Kokaji et al. | 180/68.5 |
| 2010/0086810 A1* | 4/2010 | Hood et al. | 429/13 |
| 2010/0116576 A1* | 5/2010 | Jufuku et al. | 180/68.5 |
| 2011/0117470 A1* | 5/2011 | Aras et al. | 429/452 |
| 2011/0269043 A1* | 11/2011 | Hood et al. | 429/439 |
| 2012/0295179 A1* | 11/2012 | Na et al. | 429/455 |

FOREIGN PATENT DOCUMENTS

| | | |
|---|---|---|
| JP | 2001-93556 A | 4/2001 |
| JP | 2001-169410 A | 6/2001 |
| JP | 2002-373684 A | 12/2002 |
| JP | 2003-23705 A | 1/2003 |
| JP | 2003-63332 A | 3/2003 |
| JP | 2004-42828 A | 2/2004 |
| JP | 2004-063099 A | 2/2004 |
| JP | 2006-1540 A | 1/2006 |
| JP | 2006-306249 A | 11/2006 |
| JP | 2007-280613 A | 10/2007 |
| JP | 2009-78623 A | 4/2009 |
| JP | 2010-15845 A | 1/2010 |
| WO | WO-2006/083018 A1 | 8/2006 |

OTHER PUBLICATIONS

Office Action from related Japanese Patent Appl. No. 2010-236186, dated Feb. 24, 2014.

* cited by examiner

AIR-COOLED FUEL CELL VEHICLE

TECHNICAL FIELD

This invention relates to an intake and exhaust system of an air-cooled fuel cell vehicle. In particular, the invention is a technique related to structures of intake and exhaust ducts of an air-cooled fuel cell vehicle.

BACKGROUND ART

A vehicle fuel cell system includes a water-cooled fuel cell system which cools a fuel cell stack with cooling water, and an air-cooled fuel cell stack which cools a fuel cell stack with air.

Since the air-cooled fuel cell system is capable of cooling a fuel cell stack with a reacting air, the cooling system can be simplified in comparison with the water-cooled type.

Meanwhile, the water-cooled fuel cell system generally supplies a fuel cell stack with air pressurized by a compressor.

CITATION LIST

Patent Literatures

PTL 1: Japanese Patent Application Publication No. 2004-42828
PTL 2: Japanese Patent Application Publication No. 2010-15845

SUMMARY OF INVENTION

Technical Problem

PTL 1 describes a water-cooled fuel cell system-installed vehicle in which a fuel cell stack is disposed behind a rear seat, and in which an exhaust duct configured to discharge air is disposed below the fuel cell stack. Nevertheless, if a water-cooled fuel cell stack is disposed behind a rear seat, this causes an inconvenience is that the compartment space is decreased.

In contrast, as in PTL 2, when a fuel cell stack is mounted under a floor or in an engine compartment at a vehicle front portion, the compartment space can be increased.

Nonetheless, an exhaust duct configured to discharge air from the fuel cell stack disposed at the vehicle front portion needs to be extended to the rear side of the vehicle.

In this case, a pressure loss is increased in the exhaust duct. Accordingly, air inside the exhaust duct cannot be discharged to the outside unless air supplied to the fuel cell stack is pressurized by a compressor. For this reason, in a case in which such a long exhaust duct as described above is used for an air-cooled fuel cell stack, there is a risk of decreasing the cooling performance on the air-cooled fuel cell stack unless quite a large compressor is used.

An object of this invention is to increase the vehicle compartment space of a fuel cell vehicle through installation of an air-cooled fuel cell stack, and to improve the cooling performance on the air-cooled fuel cell stack by increasing the amount of air flowing through the air-cooled fuel cell stack.

Solution to Problem

Accordingly, in order to eliminate the above-described inconveniences, this invention provides an air-cooled fuel cell vehicle including, at a rear portion of the fuel cell vehicle: a motor configured to drive a rear wheel of the fuel cell vehicle; an air-cooled fuel cell stack formed into a box shape and including, respectively on wall surfaces thereof opposed to each other, an air intake section configured to take in air used as a reacting gas and also as a cooling medium, and an air exhaust section configured to discharge an excess reacting gas containing air and hydrogen; an intake duct mounted on the air intake section; and an exhaust duct mounted on the air exhaust section and extending to a rear end portion of the fuel cell vehicle, the air-cooled fuel cell vehicle characterized in that the air-cooled fuel cell stack is disposed under a rear floor of the air-cooled fuel cell vehicle and rearward of a rear wheel axle in a vehicle longitudinal direction, while the air intake section is oriented upward and inclined in such a manner that the air intake section is located closer to the rear floor as extending to a rear side of the vehicle.

Advantageous Effects of Invention

As described above in detail, according to this invention, the air-cooled fuel cell vehicle includes, at the rear portion of the fuel cell vehicle; the motor configured to drive the rear wheel of the fuel cell vehicle; the air-cooled fuel cell stack formed into a box shape and including, respectively on the wall surfaces opposed to each other, the air intake section configured to take in air used as a reacting gas and also as a cooling medium, and the air exhaust section configured to discharge an excess reacting gas containing air and hydrogen; the intake duct mounted on the air intake section; and the exhaust duct mounted on the air exhaust section and extending to the rear end portion of the fuel cell vehicle. In the air-cooled fuel cell vehicle, the air-cooled fuel cell stack is disposed under the rear floor of the air-cooled fuel cell vehicle and rearward of the rear wheel axle in the vehicle longitudinal direction, while the air intake section is oriented upward and inclined in such a manner that the air intake section is located closer to the rear floor as extending to the rear side of the vehicle.

Thus, the above-described structure makes it possible to install the air-cooled fuel cell stack at the rearmost portion of the fuel cell vehicle and at a position lower than the rear floor while ensuring the departure angle of the fuel cell vehicle, and to increase the vehicle compartment space of the fuel cell vehicle.

Moreover, it is made possible to extend the exhaust duct straight from the air exhaust section of the air-cooled fuel cell stack to the vehicle-rear end portion, reducing the air-flow resistance of the exhaust duct.

Hence, the amount of air introduced into the air-cooled fuel cell stack through the intake duct is increased to achieve improvement in the cooling performance on the air-cooled fuel cell stack.

Accordingly, the air-cooled fuel cell stack is installed at an optimum position in the rear-wheel drive fuel cell vehicle, and improvement in the cooling performance on the air-cooled fuel cell stack is achieved.

DESCRIPTION OF EMBODIMENTS

Hereinafter, an Example of this invention will be described in detail based on the drawings.

EXAMPLE

FIGS. 1 to 7 illustrate Example of this invention.

Figure 2:
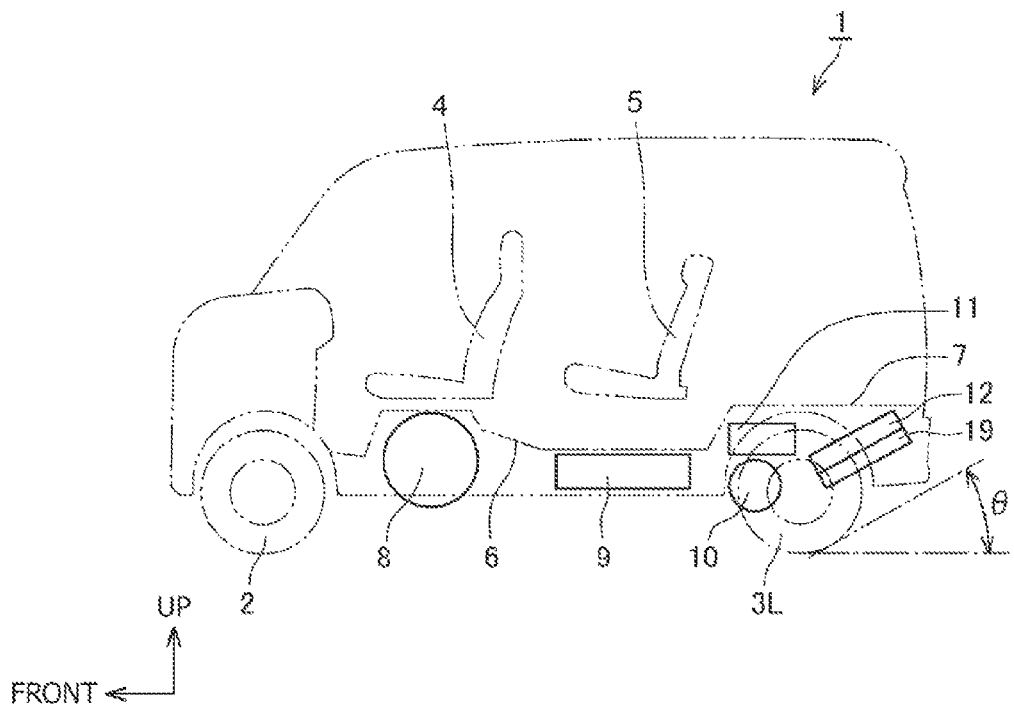
FIG. 2 is a schematic side view of an air-cooled fuel cell vehicle in which the intake and exhaust ducts are yet to be mounted. (Example)
Figure 3:
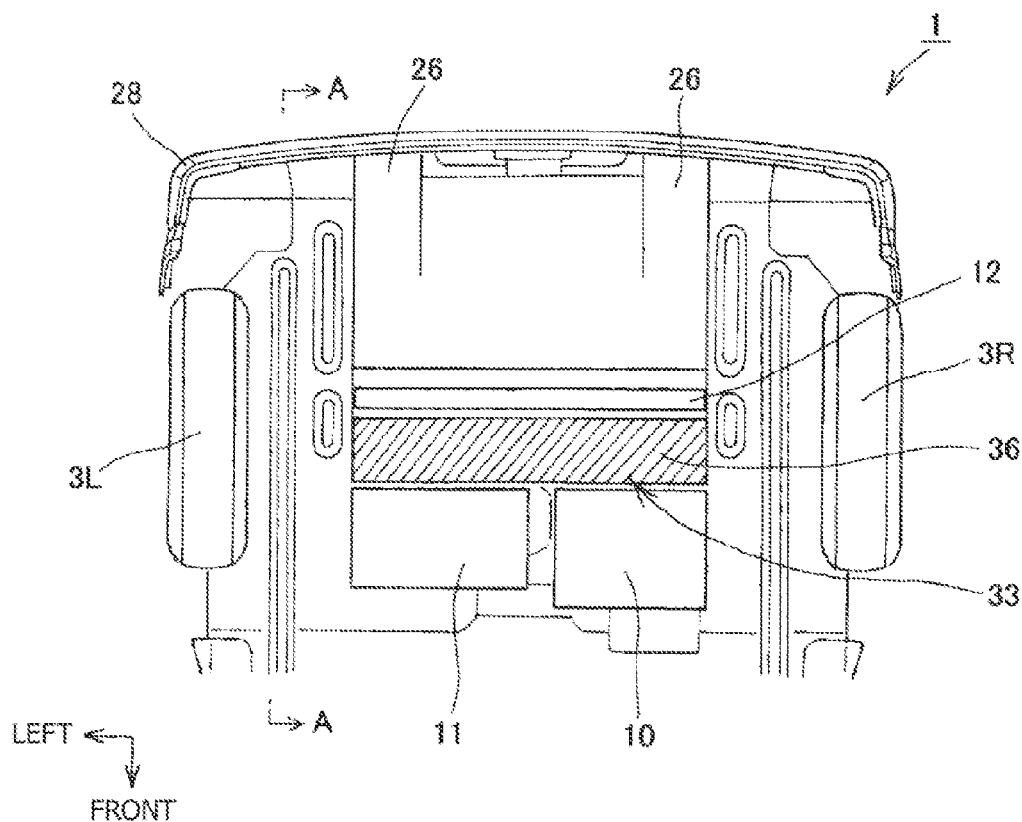
FIG. 3 is a bottom view of a rear portion of the air-cooled fuel cell vehicle. (Example)
Figure 4:
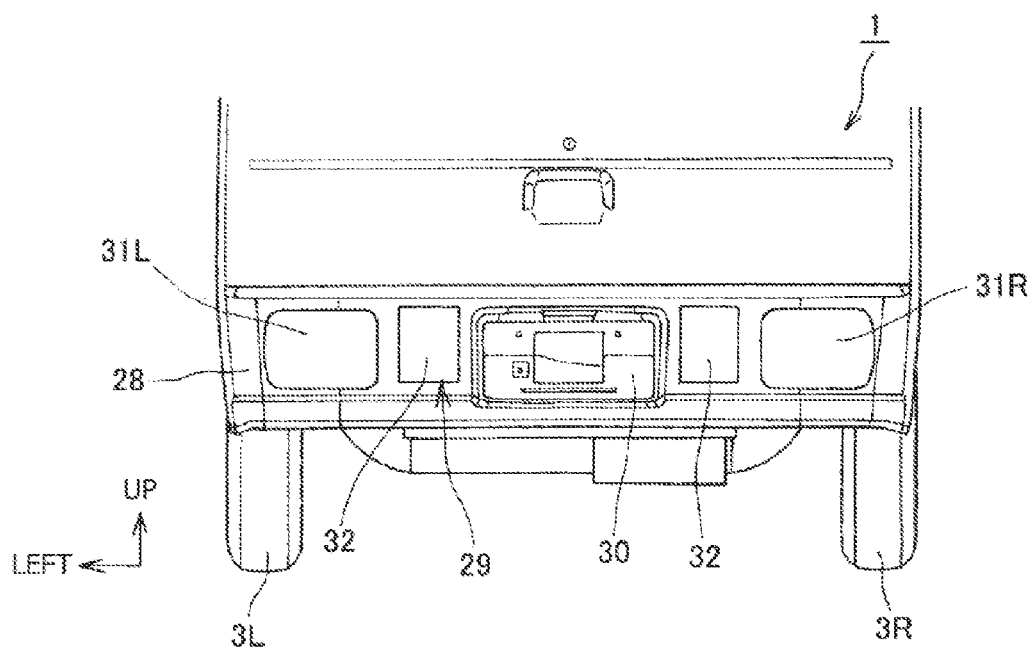
FIG. 4 is a view of the air-cooled fuel cell vehicle seen from the rear. (Example)

In FIGS. 2 to 4, reference numeral 1 denotes an air-cooled fuel cell vehicle (which may also be simply referred to as a "vehicle"); 2, a front wheel; 3L, a left rear wheel; 3R, a right rear wheel; 4, a front seat; 5, a rear seat; 6, a front floor; and 7, a rear floor.

As shown in FIG. 2, in the air-cooled fuel cell vehicle 1, a hydrogen tank 8 is disposed under the front floor 6 on which the front seat 4 is placed, and a secondary cell 9 is disposed below the rear seat 5.

Moreover, a motor 10 configured to drive the left and right rear wheels 3L, 3R, an inverter 11, and an air-cooled fuel cell stack 12 are installed under the rear floor 7, that is, at a rear portion of the air-cooled fuel cell vehicle 1.

Figure 7:
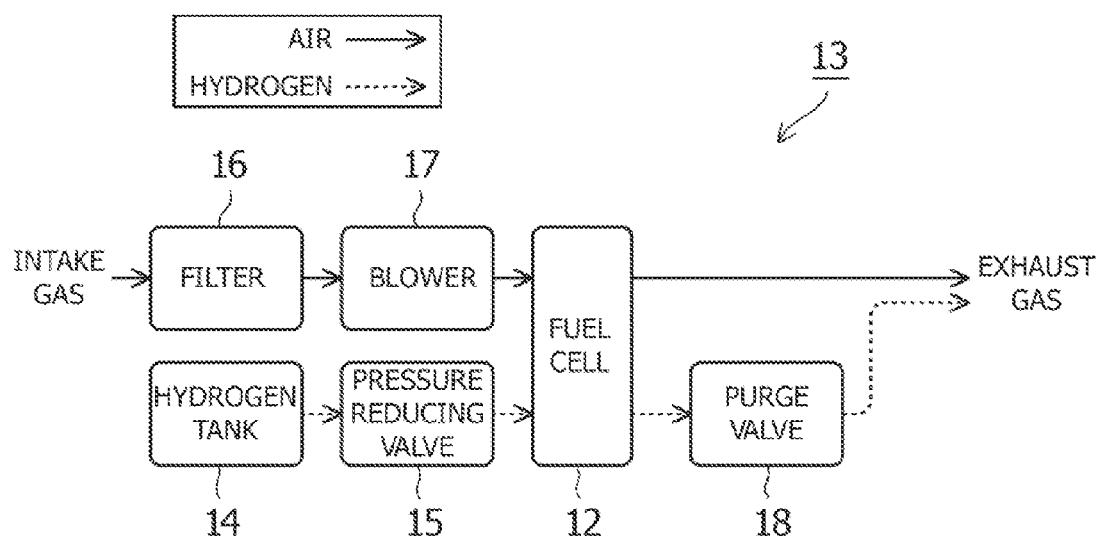
FIG. 7 is a block diagram of an air-cooled fuel cell vehicle system. (Example)

In this situation, as shown in FIG. 7, in an air-cooled fuel cell system 13, after the pressure of a hydrogen gas compressed and stored in a high-pressure hydrogen tank 14 is reduced by a pressure reducing valve 15, the hydrogen gas is introduced into an anode intake section of the air-cooled fuel cell stack 12. Meanwhile, the air-cooled fuel cell system 13 does not have a compressor configured to compress air at high pressure in a passage for supplying air to a cathode intake section, but air drawn through a filter 16 is supplied to the air-cooled fuel cell stack 12 by a blower fan 17 that is a low-pressure blower fan.

The air supplied to the air-cooled fuel cell stack 12 is not only used for a power generation reaction in the air-cooled fuel cell stack 12, but also plays a role in cooling the air-cooled fuel cell stack 12 by removing waste heat from the air-cooled fuel cell stack 12.

Anode exhaust discharged from the air-cooled fuel cell stack 12 is sent via a purge valve 18 and is mixed with cathode exhaust discharged from the air-cooled fuel cell stack 12. A hydrogen gas in the anode exhaust is diluted with the cathode exhaust to the lowest combustible concentration or lower and is emitted to the outside.

In the air-cooled fuel cell system 13, an electrochemical reaction takes place, and water is generated accompanying the reaction.

The air-cooled fuel cell stack 12 is normally constituted of a large number of minimum constituent units, called cells, stacked one on another.

Now, the layout of components such as the air-cooled fuel cell stack 12 in the vehicle will be described.

As shown in FIG. 2, in the air-cooled fuel cell vehicle 1, the hydrogen tank 8 is disposed under the front seat 4 located at a vehicle-front side.

Moreover, the air-cooled fuel cell stack 12 is disposed below a luggage compartment at the vehicle-rearmost portion in such a posture that an air intake section 21 is inclined frontward. A lower portion of the air-cooled fuel cell stack 12 is provided with a suction fan 19 that is a low-pressure blower fan for supplying the fuel cells with air.

The air supplied to the fuel cells by the suction fan 19 is used for the power generation reaction and the cooling of the air-cooled fuel cell stack 12 and is then guided to the outside of the vehicle through an exhaust duct 20 located at the vehicle-rear portion.

The motor 10 configured to drive the left and right rear wheels 3L, 3R is disposed in front of the air-cooled fuel cell stack 12. The inverter 11 is disposed above the motor 10. The secondary cell 9 is disposed below the rear seat 5.

In this situation, in this Example of the invention, the air-cooled fuel cell stack 12 is installed at the vehicle-rearmost portion, and electrical components are disposed all together at the vehicle-rear portion.

Thereby, electrical wirings, particularly, a high-voltage cable, can be prepared in the minimum length, and the noise influence, weight, and cost can be reduced to the minimum.

In addition, the wirings can be bundled in a simple manner by disposing the electrical components next to each other, and the maintenance is also simplified.

Furthermore, the maintenance is improved in dealing with an accident or a failure, as the high-voltage components are assembled at one spot.

Furthermore, by disposing all of the components under the floor, the layout in the vehicle is possible while ensuring the spaces for a passenger and a trunk.

The air-cooled fuel cell stack 12 installed at the rear portion of the air-cooled fuel cell vehicle 1 is formed into a box shape and includes, on wall surfaces thereof opposed to each other, the air intake section 21 configured to take in air used as a reacting gas and also as a cooling medium, and an air exhaust section 22 configured to discharge an excess reacting gas containing air and hydrogen.

Figure 5A:
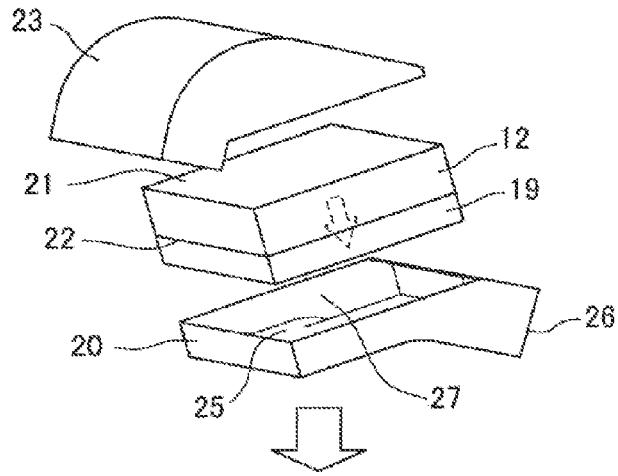
FIG. 5 shows perspective views of left front sides of the air-cooled fuel cell stack and the intake and exhaust ducts. Part (a) is a perspective view showing an assembling state, and Part (b) is a perspective view for illustrating the flow of intake and exhaust gases after the assembling. (Example)
Figure 5B:
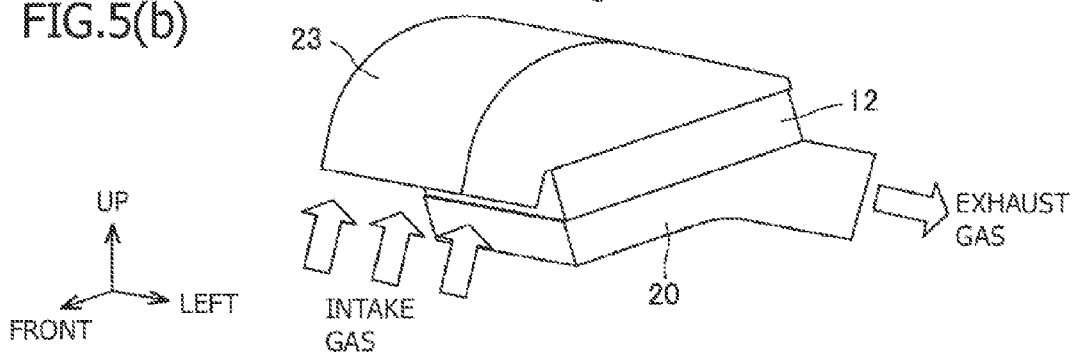

Moreover, as shown in FIG. 5, an intake duct 23 is mounted on the air intake section 21, while an exhaust duct 20 extending to a rear end portion of the fuel cell vehicle 1 is mounted on the air exhaust section 22.

In addition, the air-cooled fuel cell stack 12 is disposed under the rear floor 7 of the air-cooled fuel cell vehicle 1 and rearward of a rear wheel axle 24 in a vehicle longitudinal direction while the air intake section 21 is oriented upward and inclined in such a manner that the air intake section 21 is located closer to the rear floor 7 as extending to a rear side of the vehicle.

Figure 1:
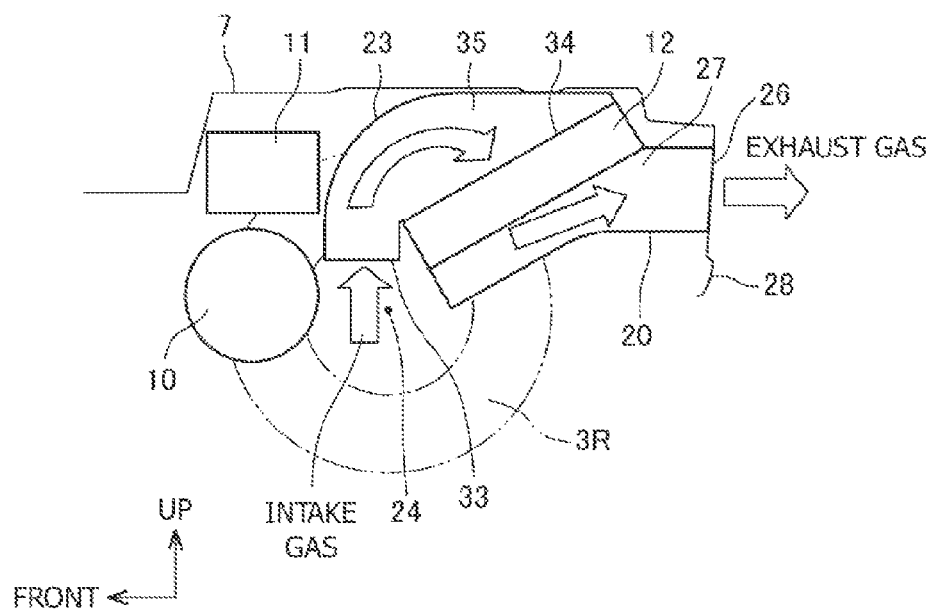
FIG. 1 is an enlarged cross-sectional view of principal parts for illustrating an arrangement of an air-cooled fuel cell stack and intake and exhaust ducts, taken along the A-A line in FIG. 3. (Example)

In more detail, when the air-cooled fuel cell stack 12 is disposed in the air-cooled fuel cell vehicle 1 as shown in FIGS. 1 and 2, the air intake section 21 is oriented upward under the rear floor 7 and rearward of the rear wheel axle 24 in the vehicle longitudinal direction, and is inclined in such a manner that the air intake section 21 is located closer to the rear floor 7 as extending to the rear side of the vehicle.

Thus, the above-described structure makes it possible to install the air-cooled fuel cell stack 12 at the rearmost portion of the fuel cell vehicle 1 and at a position lower than the rear floor 7 while ensuring a departure angle θ of the fuel cell vehicle 1, and to increase the vehicle compartment space of the fuel cell vehicle 1.

Moreover, the structure makes it possible to extend the exhaust duct 20 straight from the air-cooled fuel cell stack 12 to the vehicle-rear end portion, reducing the air-flow resistance of the exhaust duct 20.

Hence, the amount of air introduced into the air-cooled fuel cell stack 12 through the intake duct 23 is increased to achieve improvement in the cooling performance on the air-cooled fuel cell stack 12.

Accordingly, the air-cooled fuel cell stack 12 is installed at an optimum position in the rear-wheel drive fuel cell vehicle 1, and improvement in the cooling performance on the air-cooled fuel cell stack 12 is achieved.

Furthermore, a suction fan 19 is disposed at the air exhaust section 22 side of the air-cooled fuel cell stack 12.

Specifically, as shown in FIG. 5, the suction fan 19 is disposed at the air exhaust section 22 side, that is, a lower side, of the air-cooled fuel cell stack 12. The suction fan 19 is covered with the exhaust duct 20.

Thus, by disposing the suction fan 19 on the air-cooled fuel cell 12 at the air exhaust section 22 side not facing the rear floor 7 and easy to ensure a space, the effect of the suction fan 19 to suck air from the air-cooled fuel cell stack 12 is increased, thereby achieving improvement in the cooling performance on the air-cooled fuel cell stack 12.

Furthermore, the exhaust duct 20 includes an exhaust inlet port 25 on an upstream end portion and an exhaust outlet port 26 on a downstream end portion. A passage wall 27 configured to communicatively connect an upper end portion of the exhaust inlet port 25 to an upper end portion of the exhaust outlet port 26 is provided horizontally or inclined in such a manner that a height of the passage wall 27 is increased as it extends to the rear side of the vehicle.

Specifically, when the exhaust duct 20 is mounted in the air-cooled fuel cell vehicle 1, as shown in FIGS. 1 and 5, the passage wall 27 (upper surface portion) configured to communicatively connect the exhaust inlet port 25 to the exhaust outlet port 26 is inclined in such a manner that the height of the passage wall 27 is gradually increased as extending to the rear side of the vehicle.

Thus, the above-described structure makes it possible to smoothly discharge an excess hydrogen gas lighter than air in weight without stagnation inside the exhaust duct 20.

A rear bumper 28 is disposed behind the air-cooled fuel cell stack 12. The exhaust duct 20 has the exhaust outlet port 26 fitted into an opening 29 formed in the rear bumper 28.

Figure 6:
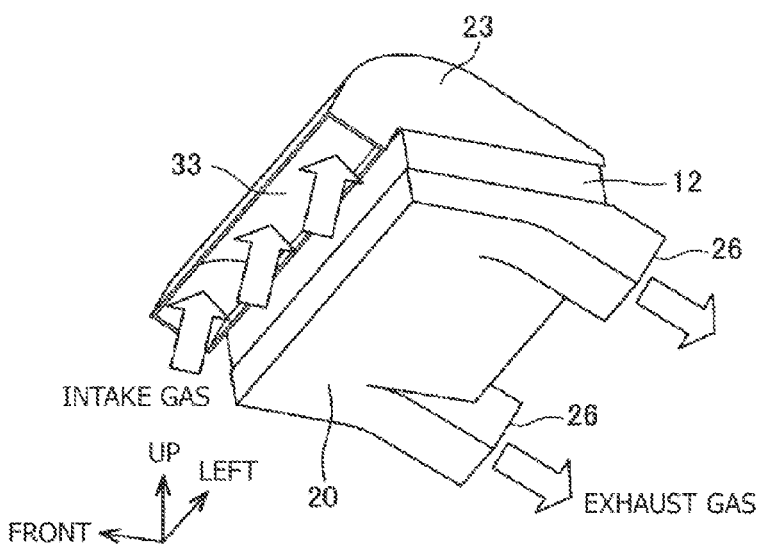
FIG. 6 is a perspective view of the left front sides of the air-cooled fuel cell stack and the intake and exhaust ducts seen from the under for illustrating the flow of intake and exhaust gases. (Example)

Specifically, as shown in FIG. 6, the exhaust outlet port 26 is formed on each of left and right sides of the exhaust duct 20.

Furthermore, in the rear bumper 28, the opening 29 is opened at positions of lateral sides of a license plate-attachment portion 30 at inner sides of left and right tail lamps 31L, 31R as shown in FIG. 4. Each of the openings 29 has a mesh cover 32 for preventing entry of foreign matter.

In this situation, the exhaust outlet ports 26 of the exhaust duct 20 are fitted into the openings 29.

Thus, the bending and the length of the exhaust duct 20 are reduced to reduce the air-flow resistance.

Moreover, the top end of the exhaust duct 20 can be supported by the rear bumper 28. The holding structure for the exhaust duct 20 can be simplified, and excess hydrogen gas contained in an exhaust gas can be prevented from stagnating inside the rear bumper 28.

Furthermore, the intake duct 23 disposed at an upper side of the air-cooled fuel cell stack 12 includes an air inlet port 33 on an upstream end portion and an air outlet port 34 on a downstream end portion. The air inlet port 33 is opened at a position lower than the air outlet port 34 in a vertical direction. A passage portion 35 in which air flows upwardly is formed between the air inlet port 33 and the air outlet port 34.

Specifically, as indicated by white arrows in FIG. 1, the air inlet port 33 of the intake duct 23 is formed in such a manner as to direct downward, and the flow of air flowing inside the intake duct 23 is turned from an upward direction to a direction obliquely downward to the rear side of the vehicle.

Note that the air inlet port 33 of the intake duct 23 has a mesh cover 36, as shown in FIG. 3, for preventing entry of foreign matter.

Thus, with the above-described structure, the flow of air flowing inside the intake duct 23 is turned from the upward direction to the obliquely downward direction, separating off water and dirt flowing into the intake duct 23 together with air. This makes it possible to prevent water and dirt from being drawn into the air-cooled fuel cell stack 12.

Now, the method of installing the air-cooled fuel cell stack 12 and the intake and exhaust ducts 23, 20 will be further described.

FIGS. 5 and 6 are views of the intake and exhaust ducts 23, 20 mounted on the air-cooled fuel cell stack 12. The intake duct 23 including the air inlet port 33 extending in a lateral direction is mounted on the air intake section 21 of the air-cooled fuel cell stack 12 disposed in such an orientation that the air intake section 21 is inclined frontward. The exhaust duct 20 is mounted on and covers the air exhaust section 22 and the suction fan 19, and is connected to the opening 29 of the rear bumper 28 shown in FIG. 4.

In this situation, by disposing the air-cooled fuel cell stack 12 in such a manner as to incline frontward, it is possible to ensure a large space for intake while the departure angle θ is taken into consideration, and to smoothly discharge purged hydrogen without stagnation inside the exhaust duct.

Moreover, the air inlet port 33 of the intake duct 23 is opened at the position lower than the inverter 11 as shown in FIG. 1. This makes it possible to avoid direct intake of heat generated from an electrical component such as the inverter 11.

Further, the air-cooled fuel cell stack 12 is disposed at the rearmost portion of the vehicle and is formed into an exhaust duct shape as shown in FIGS. 5 and 6. Accordingly, a simple exhaust passage of the shortest length can be formed, and an increase in pressure loss and a decrease in power generation efficiency can be suppressed to the minimum.

Note that this invention is not limited to the above-described Example, and various applications and modifications are possible.

For example, this Example of this invention assumes an air-cooled fuel cell. However, it is a matter of course that the layout is applicable also to a water-cooled fuel cell system.

Moreover, the following applications are possible. For example, the shape of the exhaust outlet port of the exhaust duct is not limited to the shape disclosed in this Example, and the shape can be formed to be large in size. Alternatively, the number of the exhaust outlet port may be increased, and the shape of the opening of the rear bumper may be modified.

Furthermore, as to the intake duct, the shape of the opening portion can be modified, depending on the layout in relation to other components.

The invention claimed is:

1. An air-cooled fuel cell vehicle comprising, at a rear portion of the fuel cell vehicle:
   a motor configured to drive a rear wheel of the fuel cell vehicle;
   an air-cooled fuel cell stack formed into a box shape and including, respectively on wall surfaces thereof opposed to each other, an air intake section configured to take in air used as a reacting gas and also as a cooling medium, and an air exhaust section configured to discharge an excess reacting gas containing air and hydrogen;

an intake duct mounted on the air intake section; and an exhaust duct mounted on the air exhaust section and extending to a rear end portion of the fuel cell vehicle, the air-cooled fuel cell vehicle configured such that the air-cooled fuel cell stack is disposed under a rear floor of the air-cooled fuel cell vehicle and rearward of a rear wheel axle in a vehicle longitudinal direction, while the air intake section of the air-cooled fuel cell stack is oriented toward the rear floor and inclined in such a manner that the rear end portion of the air intake section is located closer to the rear floor with respect to the forward end portion of the air intake section in the vehicle longitudinal direction, wherein a suction fan is disposed in and along the air exhaust section of the air-cooled fuel cell stack; and wherein the exhaust duct includes an exhaust inlet port, into which the suction fan is inserted, on an upstream end portion thereof and an exhaust outlet port on a downstream end portion thereof, and a passage wall configured to communicatively connect an upper end portion of the exhaust inlet port to an upper end portion of the exhaust outlet port is provided horizontally or inclined in such a manner that a height of the passage wall is increased as extending to the rear side of the vehicle.

2. The air-cooled fuel cell vehicle according to claim 1, wherein the intake duct includes an air inlet port on an upstream end portion and an air outlet port on a downstream end portion, the air inlet port is opened so as to direct downward of the vehicle behind the motor and is disposed at a position lower than the air outlet port in a vertical direction, and a passage portion in which the flow of air is introduced to the air outlet port by turning the flow of air from an upward direction to a direction obliquely downward is formed between the air inlet port and the air outlet port.

\* \* \* \* \*